(12) United States Patent
Andrews et al.

(10) Patent No.: US 11,029,463 B2
(45) Date of Patent: Jun. 8, 2021

(54) EDGE LIT LUMINAIRE

(71) Applicant: Hubbell Incorporated, Shelton, CT (US)

(72) Inventors: John William Andrews, Simpsonville, SC (US); James Andrew Brush, Greenville, SC (US)

(73) Assignee: Hubbell Incorporated, Shelton, CT (US)

( * ) Notice: Subject to any disclaimer, the term of this patent is extended or adjusted under 35 U.S.C. 154(b) by 0 days.

(21) Appl. No.: 16/875,330

(22) Filed: May 15, 2020

(65) Prior Publication Data

US 2020/0363579 A1 Nov. 19, 2020

Related U.S. Application Data

(60) Provisional application No. 62/848,879, filed on May 16, 2019.

(51) Int. Cl.
*F21V 8/00* (2006.01)
*F21V 13/04* (2006.01)
*F21V 29/71* (2015.01)

(52) U.S. Cl.
CPC ............ *G02B 6/0055* (2013.01); *F21V 13/04* (2013.01); *F21V 29/713* (2015.01)

(58) Field of Classification Search
CPC ............................. G02B 6/0055; F21V 29/713
See application file for complete search history.

(56) References Cited

U.S. PATENT DOCUMENTS

| | | | |
|---|---|---|---|
| 4,972,294 A | 11/1990 | Moses, Jr. et al. | |
| 5,343,362 A | 8/1994 | Solberg | |
| 7,988,336 B1* | 8/2011 | Harbers | F21K 9/20 362/294 |
| 8,310,158 B2* | 11/2012 | Coplin | F21V 25/10 315/32 |
| 9,151,466 B2 | 10/2015 | Ko | |
| 9,389,367 B2* | 7/2016 | Yuan | G02B 6/0038 |
| 10,416,377 B2* | 9/2019 | Girotto | G02B 6/122 |
| 10,739,513 B2* | 8/2020 | Kim | G02B 6/0038 |

(Continued)

OTHER PUBLICATIONS

PCT/US2020/0033139 International Search Report and Written Opinion dated Sep. 30, 2020.

*Primary Examiner* — Mary Ellen Bowman
(74) *Attorney, Agent, or Firm* — Michael Best & Friedrich LLP

(57) ABSTRACT

An edge-lit luminaire includes a housing, a lens, a light emitter, a first reflector, and a second reflector. The housing has a central opening that defines a central area. The lens includes a plurality of extraction features substantially evenly distributed over a lens area. The lens is positioned proximate the central opening, and the lens area is larger than the opening area. The light emitter is positioned adjacent the lens and configured to direct light in a direction generally orthogonal with respect to the central opening. The first reflector is positioned proximate a first surface of the lens distal the central opening. The first reflector substantially covers the first surface of the lens. The second reflector is positioned proximate a second surface of the lens opposite the first surface. The second reflector substantially covers the second surface of the lens outside of the central opening.

20 Claims, 10 Drawing Sheets

(56) References Cited

U.S. PATENT DOCUMENTS

| | | | |
|---|---|---|---|
| 2010/0103668 A1* | 4/2010 | Lueken | F21V 29/76 |
| | | | 362/234 |
| 2011/0051373 A1 | 3/2011 | McColloch | |
| 2012/0000636 A1 | 1/2012 | Weinmann et al. | |
| 2013/0088876 A1* | 4/2013 | Harbers | F21V 29/00 |
| | | | 362/294 |
| 2013/0088890 A1 | 4/2013 | Knapp et al. | |
| 2013/0148350 A1* | 6/2013 | Yriberri | F21V 3/02 |
| | | | 362/235 |
| 2014/0355302 A1* | 12/2014 | Wilcox | F21V 5/002 |
| | | | 362/609 |
| 2017/0235036 A1 | 8/2017 | Nichol et al. | |
| 2018/0100959 A1 | 4/2018 | Vasylyev | |
| 2018/0226014 A1 | 8/2018 | Komanduri et al. | |
| 2018/0274761 A1 | 9/2018 | Green et al. | |
| 2019/0041050 A1* | 2/2019 | Cairns | H05B 45/00 |

\* cited by examiner

EDGE LIT LUMINAIRE

BACKGROUND

The present disclosure relates to a luminaire and, more specifically, to an edge lit luminaire having moveable heat sinks.

SUMMARY

In one embodiment, an edge-lit luminaire includes a housing, a lens, a light emitter, a first reflector, and a second reflector. The housing has a central opening that defines a central area. The lens includes a plurality of extraction features substantially evenly distributed over a lens area. The lens is positioned proximate the central opening, and the lens area is larger than the opening area. The light emitter is positioned adjacent the lens and configured to direct light in a direction generally orthogonal with respect to the central opening. The first reflector is positioned proximate a first surface of the lens distal the central opening. The first reflector substantially covers the first surface of the lens. The second reflector is positioned proximate a second surface of the lens opposite the first surface. The second reflector substantially covers the second surface of the lens outside of the central opening.

In another embodiment, an edge-lit luminaire includes a housing, a first heat sink, a second heat sink, a biasing member, a lens, and a light emitter. The housing has a central opening and a first surface disposed around the central opening. The first heat sink is secured to the first surface and the second heat sink is moveably coupled to the first surface. The biasing member is coupled to the housing and applies a biasing force to the second heat sink toward the central opening. The lens is positioned between the first heat sink and second heat sink and proximate the central opening. The light emitter is positioned adjacent to the lens and configured to emit light through the central opening after passing through the lens.

In yet another embodiment, an edge-lit luminaire includes a housing, a first heat sink, a biasing member, a lens, a light emitter, and a reflector. The housing has a central opening and a first surface disposed around the central opening. The first heat sink is coupled to the first surface. The biasing member is coupled to the housing and applying a biasing force to the first heat sink toward the central opening. The lens includes a plurality of extraction features substantially evenly distributed over a lens area. The lens is positioned proximate the central opening. The light emitter is coupled to the first heat sink and positioned adjacent to the lens. The light emitter is configured to emit light through the central opening after passing through the lens. The reflector is positioned to substantially cover a surface of the lens outside of the central opening.

Other aspects of the disclosure will become apparent by consideration of the detailed description and accompanying drawings.

DETAILED DESCRIPTION

Before any embodiments are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Unless specified or limited otherwise, the terms "mounted," "connected," "supported," and "coupled" and variations thereof are used broadly and encompass both direct and indirect mountings, connections, supports, and couplings.

In general, the present disclosure relates to an edge lit luminaire. The luminaire includes moveable heat sinks to assist with thermal management.

Figure 1:
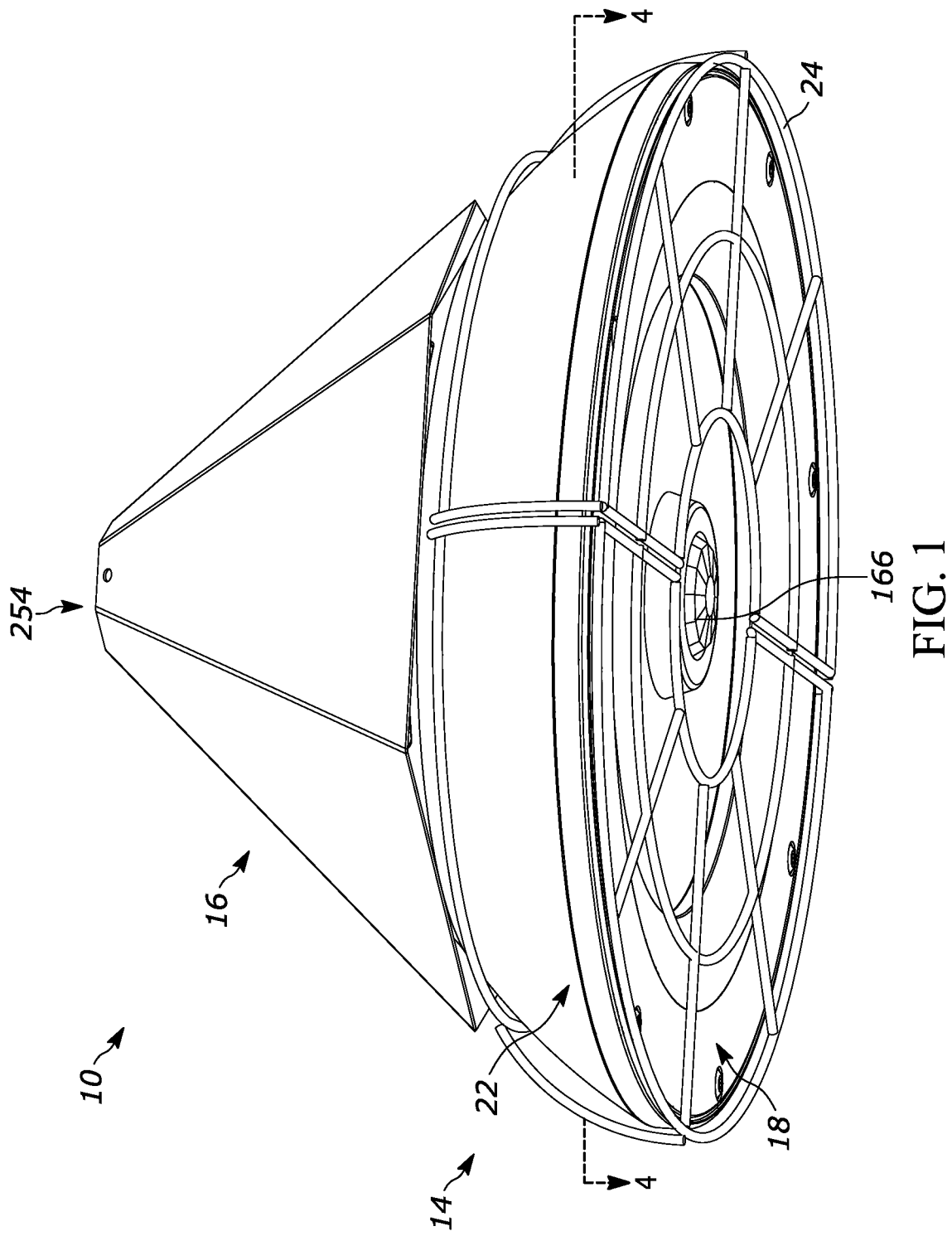
FIG. 1 is a perspective view of a luminaire.

As shown in FIG. 1, a luminaire 10 includes first or lower housing 14 and a second housing or bird guard 16. The lower housing 14 includes a first or lower portion 18 and a second or upper portion 22. Together, the lower housing 14 and the bird guard 16 define a frustoconical shape. A cage 24 is positioned around a portion of the lower housing 14 (e.g., over the lower portion 18). In the illustrated embodiment, the lower portion 18 and the upper portion 22 are cast in aluminum. In other embodiments, the portions 18, 22 may be formed using different methods or may be made from different materials.

Figure 2:
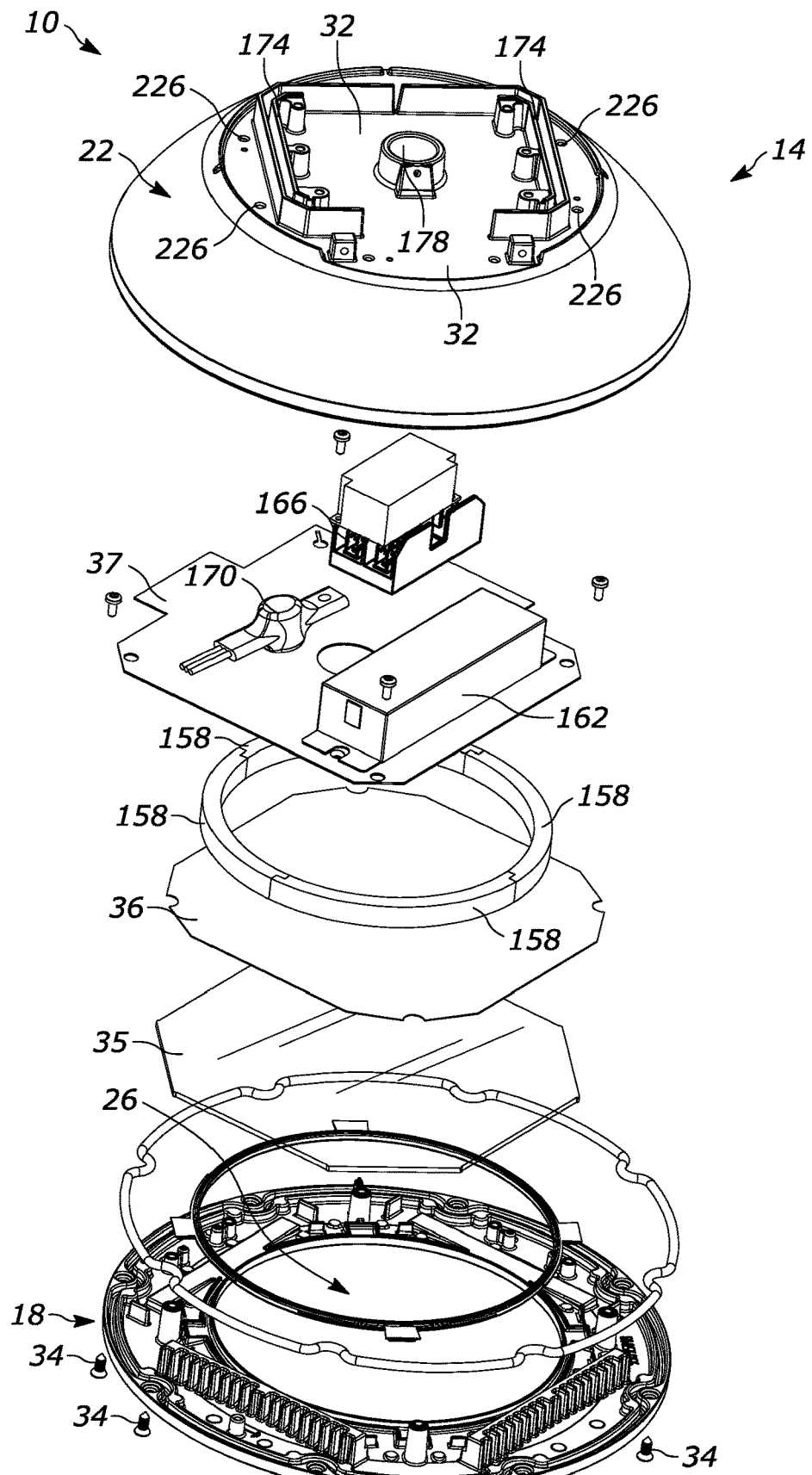
FIG. 2 is an exploded view of the luminaire of FIG. 1 with a bird guard removed.

As shown in FIG. 2, the upper portion 22 is larger than the lower portion 18, and generally defines the frustoconical shape. The lower portion 18 is generally ring shaped and includes a central opening 26. The upper portion 22 is generally hollow, and defines a housing cavity 30 (see e.g., FIG. 4) while the lower portion 18 is coupled to the upper portion 22. The upper portion 22 also includes an upper surface 32 positioned outside of the cavity 30. In the illustrated embodiment, fasteners 34 (e.g., threaded screws) are inserted through the lower portion 18 and into the upper portion 22. In other embodiments, the fasteners may be inserted in other directions, or fasteners 34 may not be needed (e.g., the lower portion 18 screws into the upper portion 22). A lens 35, a first or upper reflector 36, and a bracket 37 are each positioned within the cavity 30. In the illustrated embodiment, lens 35, upper reflector 36, and bracket 37 are arranged in sequential order so that the lens 35 is proximate the lower portion 18 and the bracket 37 is proximate the upper portion 22.

Figure 3A:
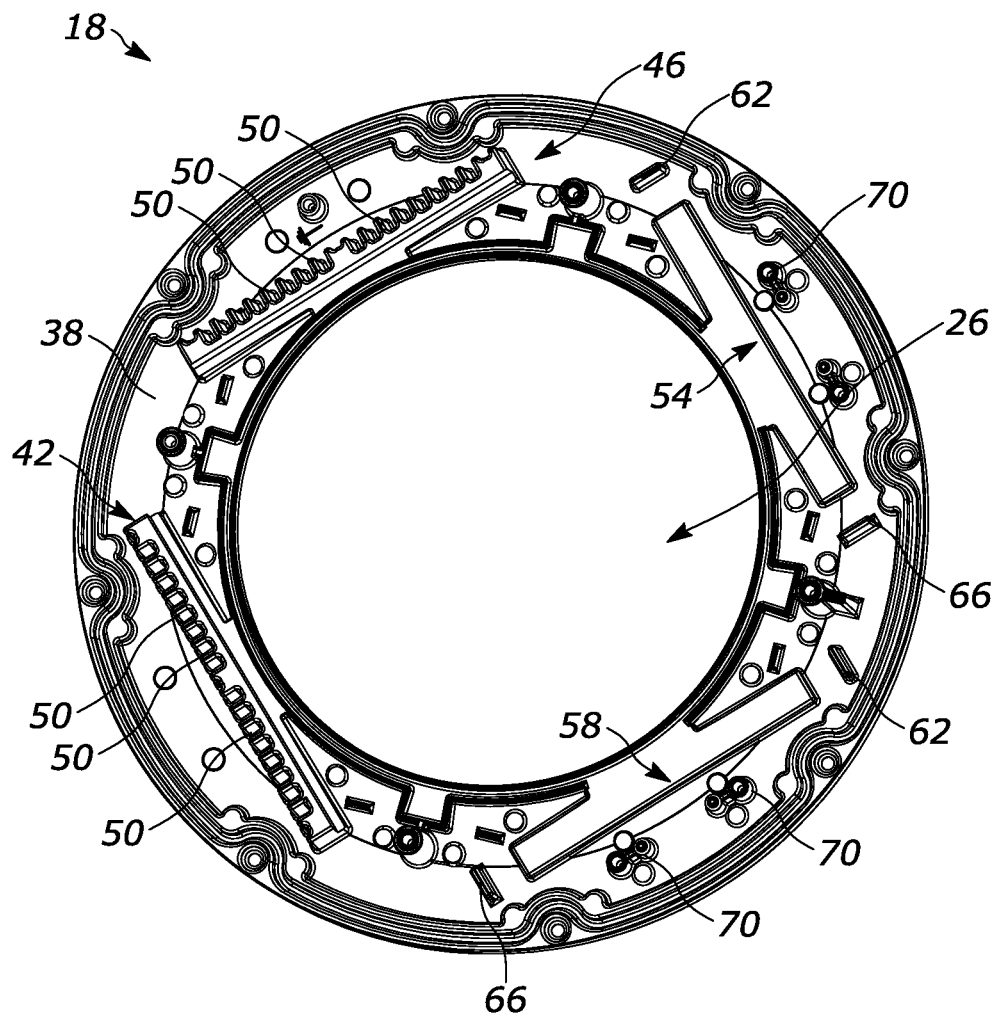
FIG. 3A is a perspective view of a lower portion of the luminaire of FIG. 1.

As shown in FIG. 3A, the lower portion 18 includes a first surface 38 that is configured to face the upper portion 22 (i.e., the first surface 38 is positioned within the cavity 30). A first heat sink 42 and a second heat sink 46 are coupled to the first surface 38. The first and second heat sinks 42, 46 are spaced apart from one another and arranged around the circumference of the central opening 26. Each heat sink 42, 46 includes a plurality of heat fins 50. The heat fins 50 are arranged in a direction generally orthogonal with respect to the first surface 38 (e.g., vertically). In the illustrated embodiment, the first and second heat sinks 42, 46 are integrally formed on the first surface 38 and fixed relative to the central opening 26. The heat sinks 42, 46 are also substantially identical and include the same number of heat fins 50.

The first surface 38 also includes a first platform 54 and a second platform 58. Each platform 54, 58 is defined by a first projection 62 and a second projection 66 that extend from the first surface 38. The first and second platforms 54, 58 are spaced apart from one another and arranged around the circumference of the central opening 26. In the illustrated embodiment, the first heat sink 42 is opposite the first platform 54 and the second heat sink 46 is opposite the second platform 58. The first heat sink 42 is arranged generally orthogonally with respect to the second heat sink 46 (i.e., the heat sinks 42, 46 are spaced 90° apart around the circumference of the central opening 26).

Fastening apertures 70 are disposed proximate the first platform 54 and proximate the second platform 58. The fastening apertures 70 are integrally formed with, and extend away from the first surface 38 as a generally cylindrical body. In the illustrated embodiment, two fastening apertures are disposed proximate each platform 54, 58.

Figure 3B:
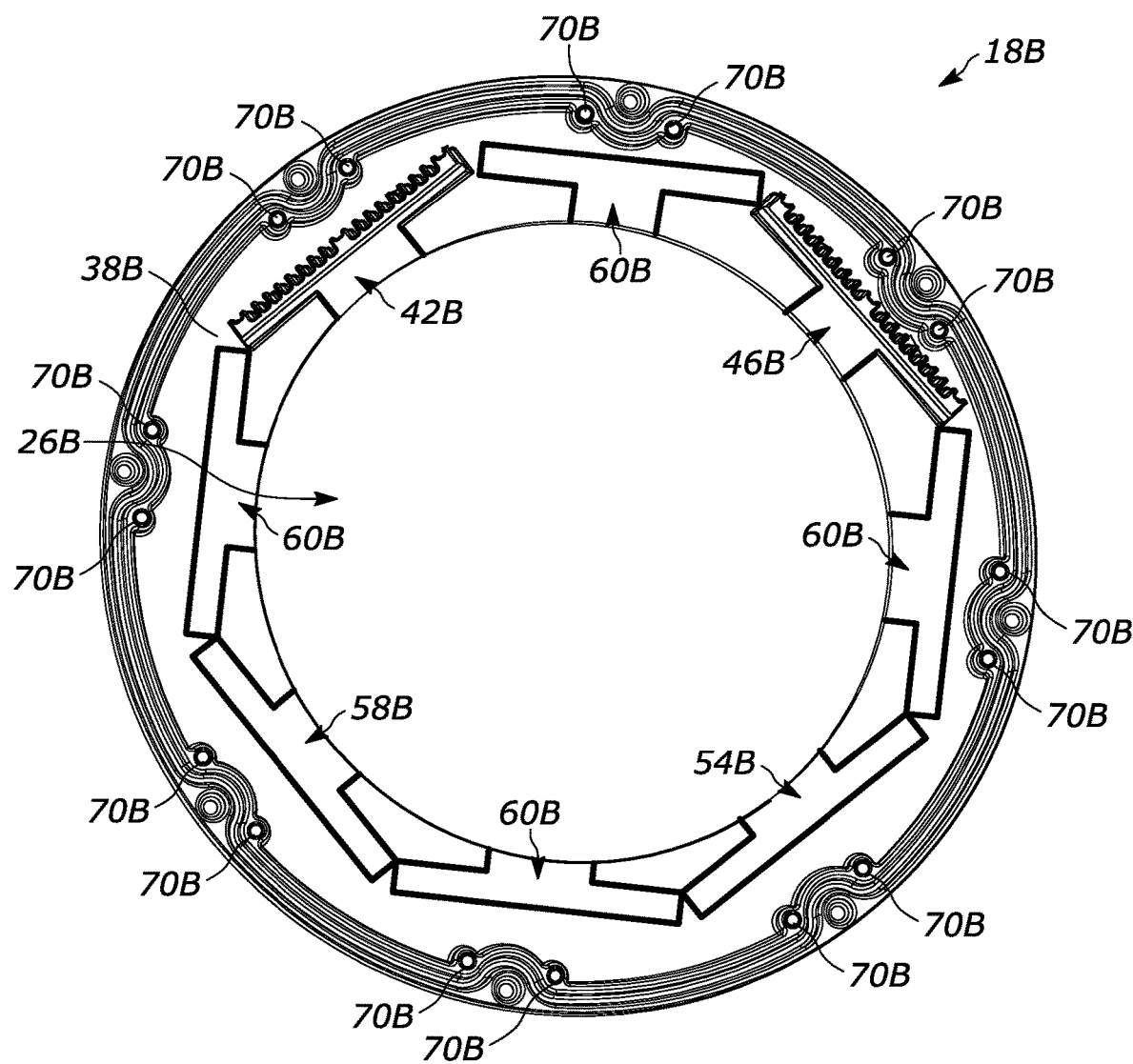
FIG. 3B is a perspective view of a lower portion of the luminaire of FIG. 1 according to another embodiment.

As shown in FIG. 3B, a lower portion 18B has a larger inner and outer radius than the lower portion 18. The central opening 26B of the lower portion 18B is therefore larger than the central opening 26 of the lower portion 18. A first surface 38B of the lower portion 18B includes a first heat sink 42B and a second heat sink 46B. The first heat sink 42B and the second heat sink 46B are substantially similar to the heat sinks 42, 46 of the lower portion 18. In the illustrated embodiment, the first heat sink 42B is arranged generally orthogonally with respect to the second heat sink 46B (i.e., the heat sinks 42B, 46B are spaced 90° apart around the circumference of the central opening 26B).

The first surface 38B also includes a first platform 54B, a second platform 58B, and third platforms 60B. Each platform 54B, 58B, 60B is defined by a first projection 62B and a second projection 66B that extend from the first surface 38B. The first, second, and third platforms 54B, 58B, 60B are spaced apart from one another and arranged around the circumference of the central opening 26B. In the illustrated embodiment, the first heat sink 42B is opposite the first platform 54B and the second heat sink 46B is opposite the second platform 58B. Third platforms 60B are disposed between proximate heat sinks 42B, 46B and platforms 54B, 58B. For example, a third platform 60B is disposed on either side of the first heat sink 42B and between the respective second heat sink 46B and the second platform 58B. The third platforms 60B are equally spaced about the central opening (i.e., 90° apart), and all of the heat sinks 42B, 46B and platforms 54B, 58B, 60B are also equally spaced apart (i.e., 45° apart).

Fastening apertures 70B are disposed proximate the first platform 54B, proximate the second platform 58B, and proximate the third platform 60B. The fastening apertures 70B are integrally formed with, and extend away from the first surface 38B as a generally cylindrical body. In the illustrated embodiment, two fastening apertures are disposed proximate each platform 54B, 58B, 60B.

Figure 4:
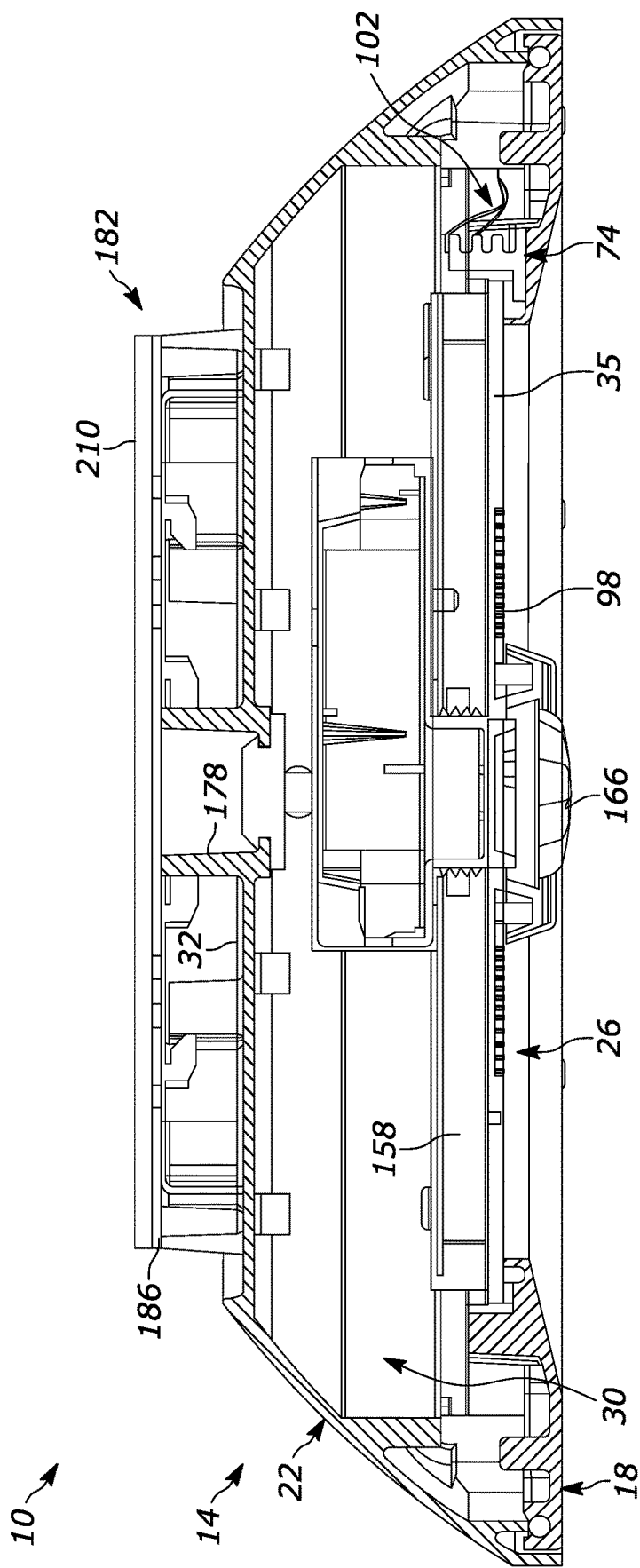
FIG. 4 is a cross-sectional view of the luminaire of FIG. 1, viewed along line 4-4.
Figure 5:
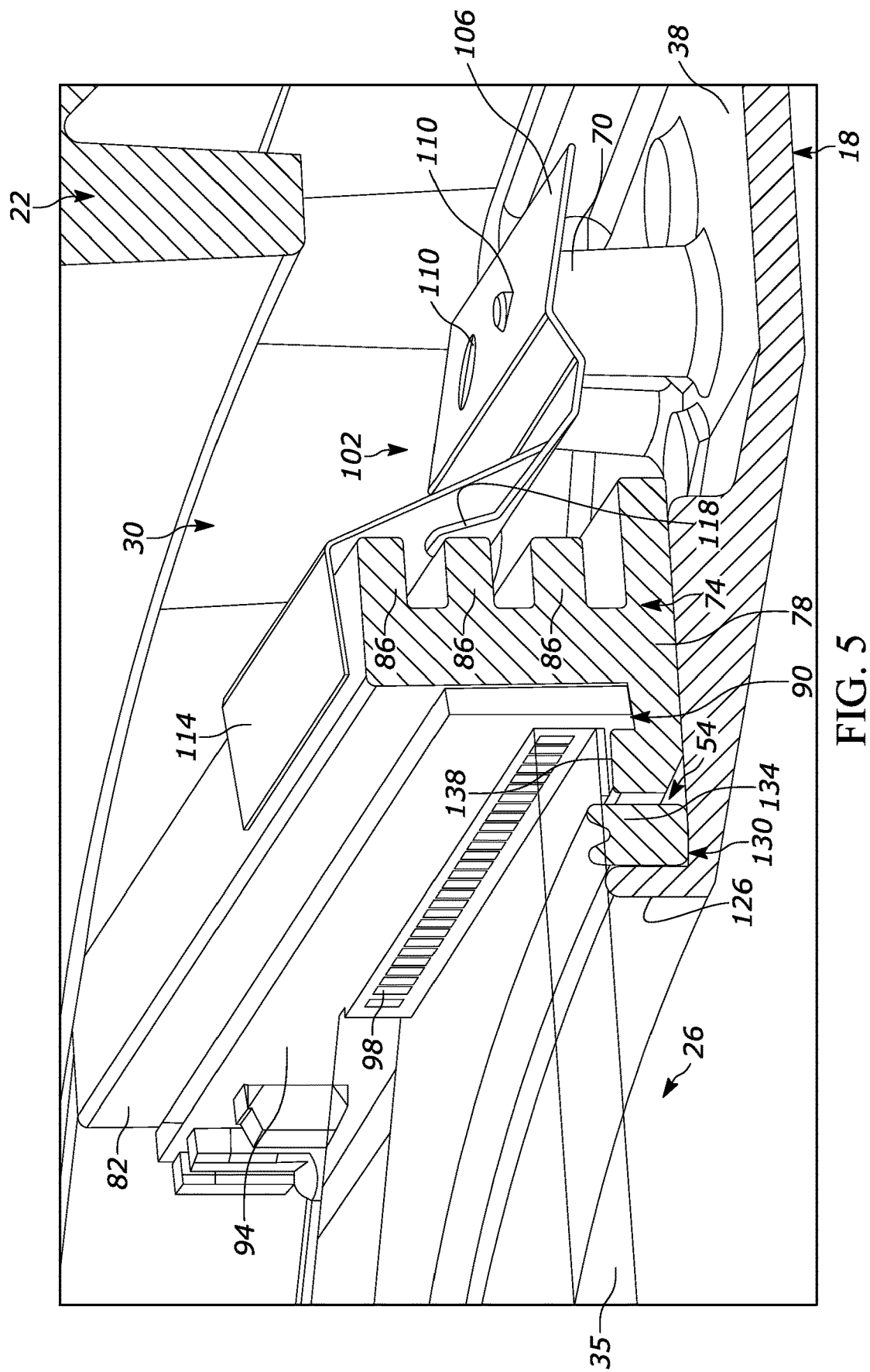
FIG. 5 is a detail view of the luminaire of FIG. 4, illustrating a moveable heat sink.

As shown in FIGS. 4 and 5, moveable heat sinks 74 are positioned in each platform 54, 58 (or 54B, 58B, 60B). Each moveable heat sink 74 includes a substantially flat base 78 that rests against the first surface 38 (e.g., the platform 54, 58) between the first and second projections 62, 66. The moveable heat sinks 74 are able to move radially along the first surface 38 relative to the central opening 26. The projections 62, 66 retain the moveable heat sinks 74 from moving angularly with respect to the central opening 26. A vertical section 82 extends from the base 78 and includes a plurality of heat fins 86 (e.g., three heat fins 86). In the illustrated embodiment, the heat fins 86 extend orthogonally (e.g., horizontally) from the vertical section 82.

Each moveable heat sink 74 also includes a channel 90 that extends along a length of the base 78 and is disposed proximate the vertical section 82. The channel 90 includes a surface that is depressed relative to the rest of the base 78. In the illustrated embodiment, the heat fins 86 extend in an opposite direction from the channel 90. A printed circuit board (PCB) 94 is positioned within each channel 90. Each PCB 94 includes a light emitter 98 (e.g., a strip of light emitting diodes (LEDs)). The light emitter 98 extends at least partially along the length of the of the PCB 94. In the illustrated embodiment, each PCB 94 is coupled to its respective vertical section 82 using thermal tape (not shown). The thermal tape eliminates the need to utilize fasteners (e.g., threaded screws) to couple the PCBs 94 to the moveable heat sinks 74.

A clip 102 is coupled to the first surface 38 proximate each of the moveable heat sinks 74. Each clip 102 includes a main body 106 with a pair of holes 110. Each clip 102 is positioned adjacent a pair of fastening apertures 70, and a fastener (e.g., a threaded screw—not shown) is inserted through each respective hole 110 and fastening aperture 70.

A first arm 114 and a second arm 118 extend away from the main body 106 of each clip 102. The first arm 114 contacts an upper surface of the respective vertical section 82, and the second arm contacts at least one of the respective fins 86. In the illustrated embodiment, the first arm 114 provides a first biasing force to the respective moveable heat sink 74, and the second arm 118 provides a second biasing force to the respective moveable heat sink 74. The first biasing force is directed toward the first surface 38 (e.g., in a generally vertical direction) and the second biasing force is directed toward a center of the central opening 26 (e.g., in a generally horizontal direction).

Figure 6:
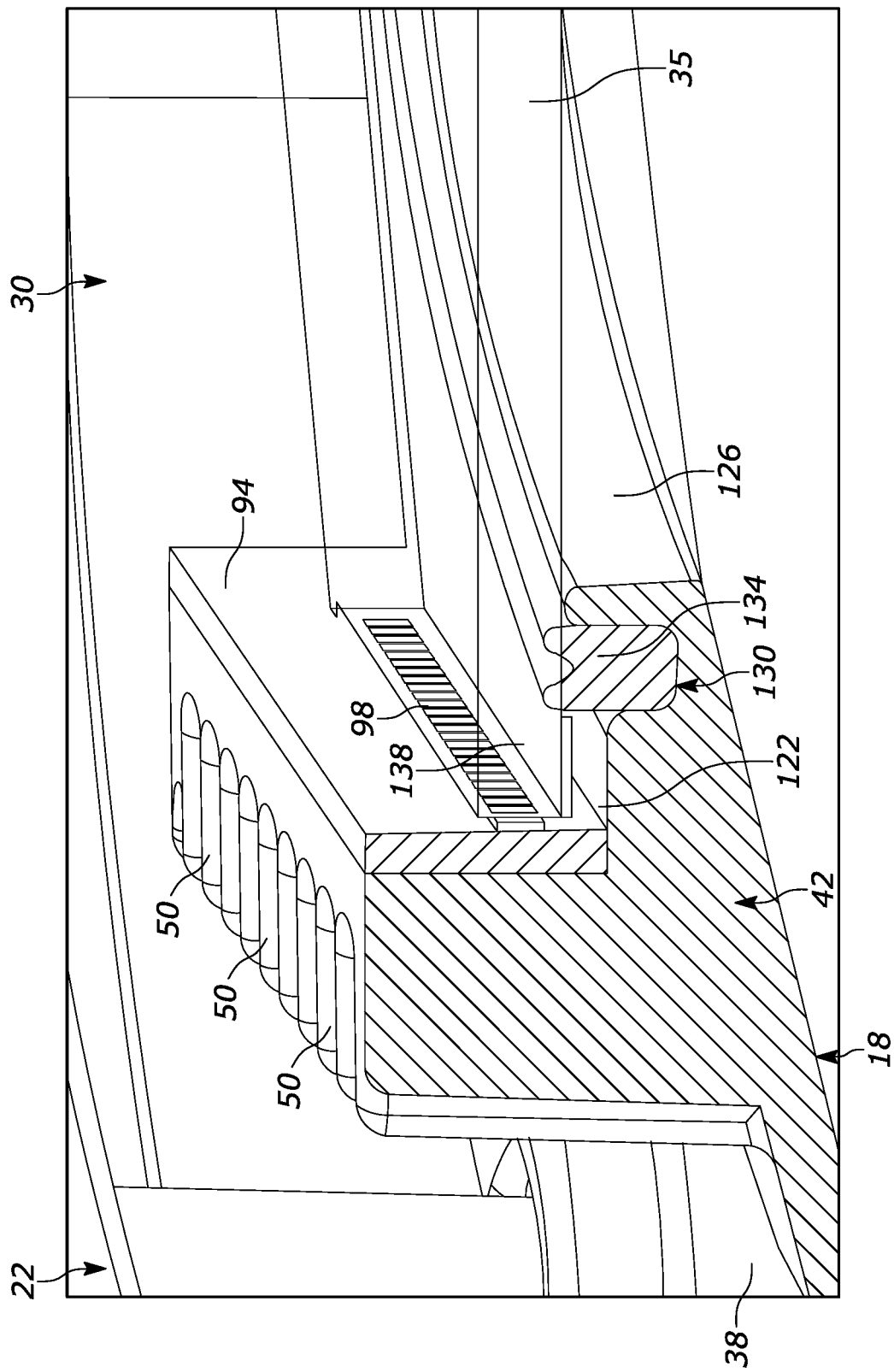
FIG. 6 is a detail view of the luminaire of FIG. 4, illustrating a fixed heat sink.

As shown in FIGS. 4 and 6, PCBs 94 are also coupled to the fixed heat sinks 42, 46. Each PCB 94 rests in a bottom surface 122 of the respective fixed heat sink 42, 46 and extends to approximately an upper surface of the respective fixed heat sink 42, 46. In the illustrated embodiment, light emitters 98 on all PCBs 94 (i.e., coupled to both fixed heat sinks 42, 46 and moveable heat sinks 74) are positioned at substantially the same height relative to the first surface 38.

With continued reference to FIGS. 5 and 6, a lip 126 extends from the first surface 38 and defines the circumference of the central opening 26. A groove 130 is formed along the first surface 38 adjacent to the lip 126. The groove 130 is defined between the bottom surfaces 122 and the lip 126 proximate each of the fixed heat sinks 42, 46, and between the base 78 and the lip 126 proximate each of the moveable heat sinks 74. A gasket 134 is positioned within the groove 130. The moveable heat sinks 74 are biased by the clips 102 toward the gasket 134 so that there is a substantially small gap between the moveable heat sinks 74 and the gasket 134.

As shown in FIGS. 4-6, the lens 35 is positioned within the housing 14 proximate the central opening 26, and substantially covers an area within the heat sinks 42, 46, 74 (e.g., over the central opening 26 and the groove 130). The lens 35 rests on top of the gasket 134 and is positioned adjacent each of the PCBs 94. The clips 102 bias the moveable heat sinks 74 into the lens 35 so that the light emitters 98 firmly press against the lens 35. In the illustrated embodiment, the lens 35 is octagonal in shape. Sides of the lens 35 generally correspond to the length of the light emitters 98. Alternating sides of the lens 35 correspond to light emitters 98 in the lower portion 18 (see e.g., FIG. 3A), and each side of the lens 35 corresponds to the light emitters in the lower portion 18B (see e.g., FIG. 3B).

A second or lower reflector 138 is positioned around the circumference of the central opening 26 between the gasket 134 and the heat sinks 42, 46, 74. The lower reflector 138 includes an outer profile that is substantially similar to an outer profile of the lens 35. In the illustrated embodiment, the lower reflector 138 is coupled to the lens 35. In other embodiments, the lower reflector 138 may rest between the lens 35 and the bottom surfaces 122 and bases 78.

Figure 7:
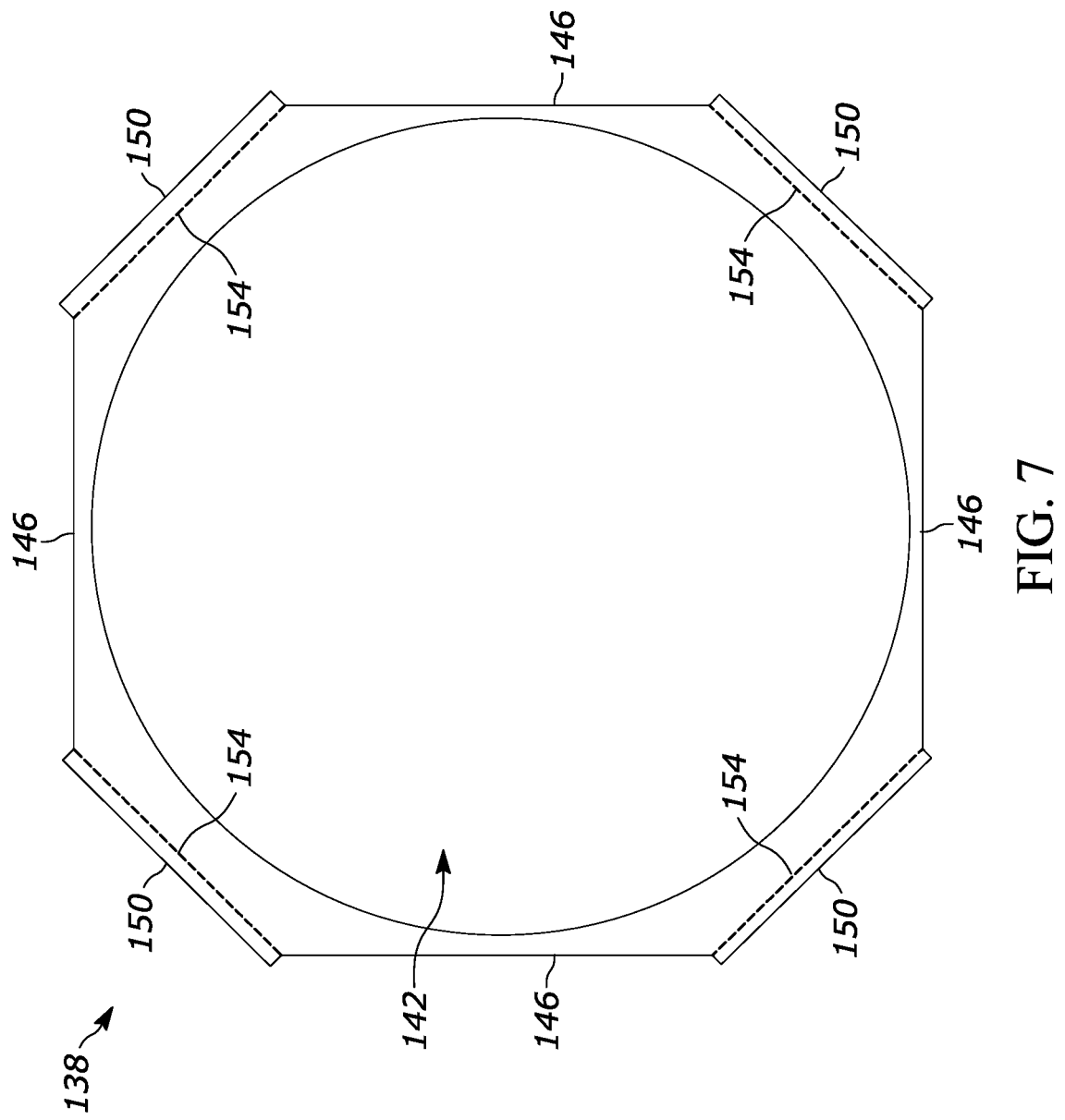
FIG. 7 is a top view of a reflector used in the luminaire of FIG. 1.

As shown in FIG. 7, the lower reflector 138 includes a generally octagonal profile and an opening 142. The opening 142 is substantially the same size as the central opening 26 of the lower portion 18 (or lower portion 18B). The lower reflector 138 includes four first sides 146 and four second sides 150. Each second side 150 is disposed between a pair of first sides 146. In the illustrated embodiment, the first sides 146 are longer than the second sides 150, and are positionable adjacent the PCBs 94. The second sides 150 extend beyond the first sides 146 and include a scored or perforated region 154. In the illustrated embodiment, the perforated regions 154 extend between corners of the first sides 146. The second sides 150 may be folded along the perforated region 154.

Returning to FIG. 2, the upper reflector 36 is also octagonal in shape and encompasses substantially the same area as the lens 35. Spacers 158 are positioned between bracket 37 and the upper reflector 36. In the illustrated embodiment, the spacers 158 are made from foam. The bracket 37 is coupled to the lower portion 18 and provides a compressive force to the lens 35 via the spacers 158. The compressive force seats the lens 35 firmly against the gasket 134.

The bracket 37 supports a variety of electrical components including a driver 162, an occupancy sensor 166, and a fuse 170. Each of these components 162, 166, 170 are in electrical communication with, and may provide control for, the light emitters 98 on the PCBs 94. In other embodiments, different electrical components may be supported on the bracket 37.

In operation, the driver 162 actuates the light emitters 98 and turns them on (i.e., the light emitters 98 are emitting light). Each light emitter 98 is positioned adjacent a first side 146 of the lens 35, and emits light toward a center of the lens (i.e., in a direction along the first surface 38). The luminaire 10 therefore is an edge-lit light, and emits light out of the housing 14 in a direction substantially orthogonal with respect to the direction the light leaves the light emitters 98 (i.e., the light emitters 98 are positioned 90° from the central opening 26). In order to direct the light at a substantially right angle, the lens 35 includes extraction features, which alter the path of the light and allow it to bend toward the central opening 26.

In the illustrated embodiment, extraction features exist throughout the lens 35 (i.e., over the entire area). In other words, the lens 35 can be a stock lens 35 that is not custom made for the specific central opening 26. This allows the lens 35 to be used with either the lower portion 18 or the lower portion 18B. Using a stock lens 35 as opposed to a custom lens reduces manufacturing costs associated with the lens 35.

Since the extraction features are positioned throughout the lens 35 and not just over the central opening 26, light is able to leave the lens 35 anywhere across the surface of the lens 35. Allowing the light to enter the housing 14 instead of through the central opening 26 creates inefficiencies in the luminaire 10 because not all of the light produced by the light emitters 98 passes through the central opening 26 and to an external environment (e.g., a garage).

The upper and lower reflectors 36, 138 help to correct this issue by reflecting light back into the lens 35 so that light is directed through the central opening 26. No light should be emitted toward the upper portion 22 of the housing 14 since there is no defined exit for the light in that direction (e.g., upwardly and into a ceiling). The upper reflector therefore, extends substantially across the entire upper surface of the lens 35 and directs light extracted in a direction opposite the central opening (e.g., upwardly) back into the lens 35. The lower reflector 138 extends only along the lower surface of the lens 35 that is outside of the central opening 26. The lower reflector 138 directs light emitted in the direction of the central opening 26 (e.g., downwardly) but outside the circumference of the central opening 26 back into the lens 35. Additionally, the second sides 150 may be folded along the perforated region 154 and brought into contact with surfaces of the lens 35 not contacting light emitters 98. The folded second sides 150 reflect light emitted along the first surface 38 back into the lens 35. Including the upper and lower reflectors 36, 138 therefore allows the stock lens 35 to be used in place of a custom lens without sacrificing the efficiency of the overall luminaire 10. The reflectors 36, 138 substantially block light not directed through the central opening 26, so that only light directed toward the central opening is allowed to escape the lens 35. The cage 24 may provide some protection to the lens 35 against contact but does not substantially block light that is emitted out of the central opening 26.

The light emitters 98 produce heat as they are turned on. The heat is transferred via conduction to the lens 35. The lens 35 expands as it heats up and applies a thermal expansive force to the heat sinks 42, 46, 74 through the PCBs 94. When the thermal expansive force exceeds the biasing force of the clips 102, the moveable heat sinks 74 radially translate away from the central opening 26. As the lens 35 cools (e.g., after the light emitters 98 are turned off), the thermal expansive force is reduced and eventually is exceeded by the biasing force. The second arm 118 applies a force to the respective moveable heat sink 74, and returns the heat sink to its original position (i.e., substantially adjacent to the gasket 134).

Figure 8:
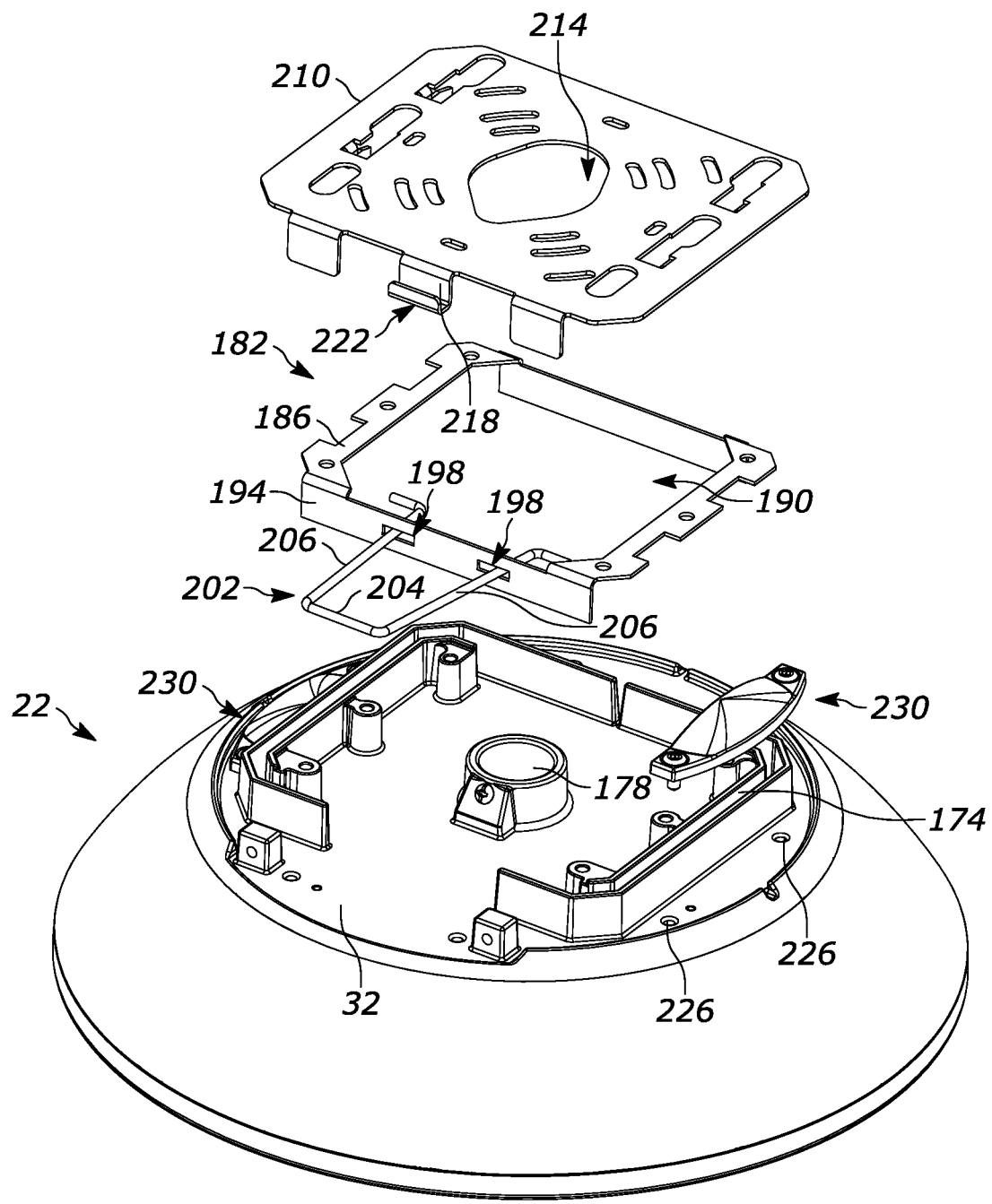
FIG. 8 is an exploded view of the luminaire of FIG. 1 illustrating an upper portion and mounting features.

As shown in FIG. 8, the upper surface 32 of the upper portion 22 includes a mounting feature 174 and an opening 178. The mounting feature 174 is disposed proximate a perimeter of the upper portion 22, and extends away from the upper surface 32. The opening 178 is partially surrounded by the mounting feature 174. The opening 178 is positioned above the bracket 37 and provides communication into the cavity 30 (see e.g., FIG. 4).

A mounting arrangement 182 coupled to the upper surface 32 of the upper portion 22. The mounting arrangement 182 includes a first bracket 186 that is positioned over the mounting feature 174, and is coupled to the mounting feature 174 with a plurality of fasteners (e.g., threaded screws—not shown). In the illustrated embodiment, the first bracket 186 includes a central space 190 that is wider than the opening 178 so as not to obstruct the opening 178. The first bracket also includes a bent portion 194 that is generally orthogonal with respect to the rest of the first bracket 186. The bent portion 194 extends towards the upper surface 32 and includes a pair of apertures 198. The apertures 198 have a rectangular shape and are spaced apart from one another.

A hanger (e.g., a wire hanger) 202 formed from a bent piece of material (e.g., metal). The hanger 202 includes a first end 204 and a pair of second ends 206 that bend away from the first end 204. The second ends 206 are inserted through the pair of apertures 198 and extend toward the opening 178. The first end 204 prevents the hanger 202 from extending completely through the pair of apertures 198. The second ends 206 of the hanger 202 may couple to an inner surface of the mounting feature 174 in order to couple the hanger 202 to the upper portion 22. While the hanger 202 is coupled to the upper portion 22, the first bracket 178 is further prevented from being removed from the upper portion 22.

A second bracket 210 is coupled to an upper surface 32 of the first bracket 186 (e.g., distal the upper surface 32). The second bracket 210 includes an opening 214 that is generally aligned with the opening 178 of the upper surface 32. The second bracket 210 also includes a tab 218 that is generally orthogonal with respect to the rest of the second bracket 210. The tab 218 defines a channel 222 that receives the first end 204 of the hanger 202. In the illustrated embodiment, the channel 222 opens away from the upper surface 32. The hanger 202 limits the movement of the second bracket 210 while it is received in the channel 222.

The upper surface 32 also includes mounting apertures 226. In the illustrated embodiment, the mounting apertures 226 are disposed between the mounting feature 174 and the outer perimeter of the upper portion 22. A pair of mounting apertures 226 are disposed opposite one another on the upper surface 32.

Figure 9:
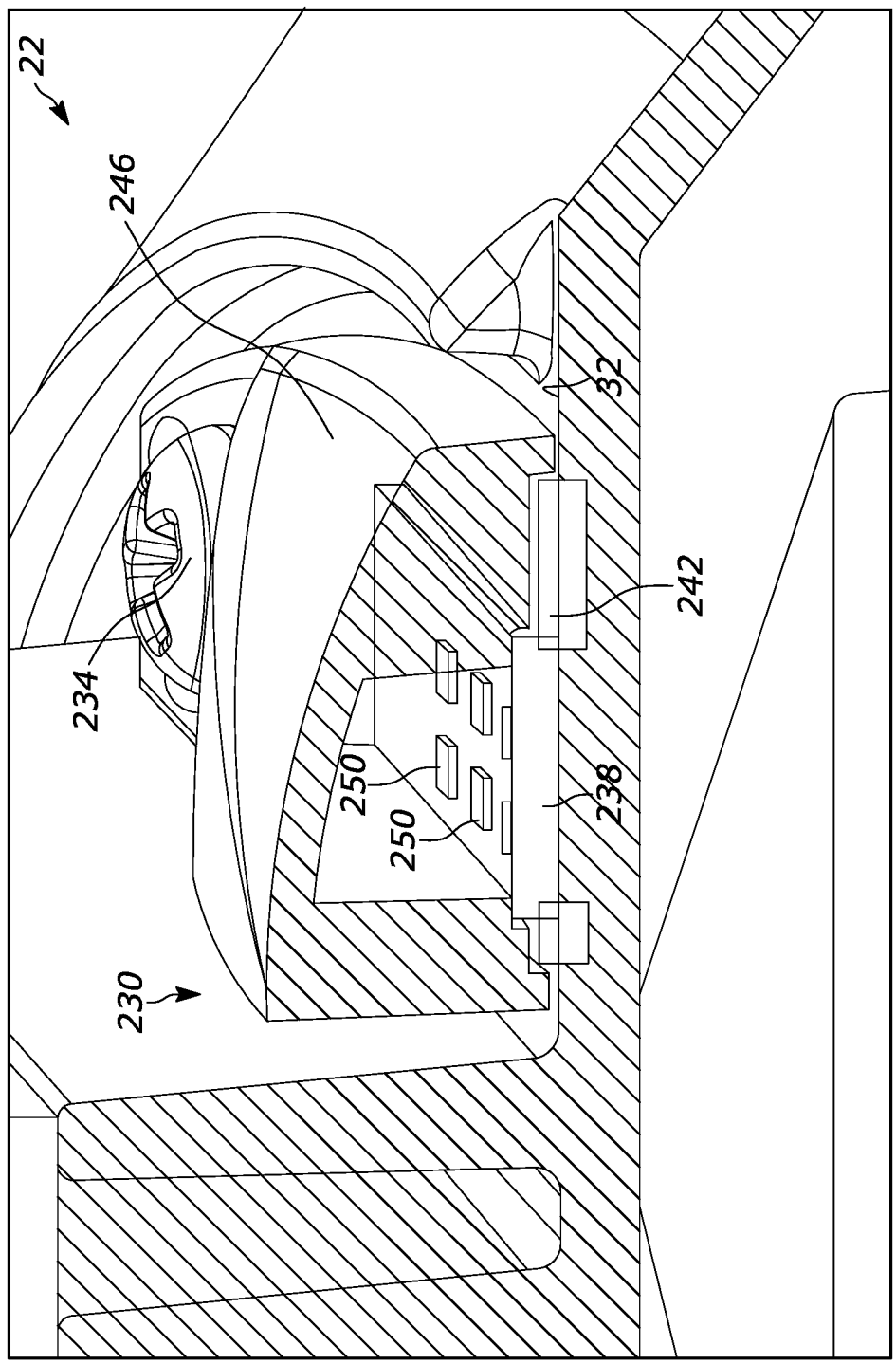
FIG. 9 is a detail view of the luminaire of FIG. 8, illustrating an uplight.

As shown in FIG. 9, two uplights 230 are coupled to the upper surface using fasteners 234 that are inserted into the respective pair of mounting apertures 226. The uplights 230 include a board 238 positioned between a gasket 242 and a lens 246. The board 238 includes a plurality of light emitters 250 (e.g., LEDs). The lens 246 includes an aperture (not shown) that receives one of the fasteners 234. The uplights 230 are coupled to the upper surface 32 so that light emitted by the uplights 230 is directed substantially opposite the direction of light emitted by the light emitter 98 through the central opening 26.

Returning to FIG. 1, the bird guard 16 is coupled to the lower housing 14 and partially surrounds the mounting arrangement 182 and uplights 230 in order to limit or prevent unauthorized access (e.g., by animals). The bird guard 16 includes an upper opening 254 that is aligned with the opening and may allow light for the uplight 230 to pass through. The bird guard 16 may also be transparent or translucent and allow light from the uplight 230 to pass through the surface.

The embodiment(s) described above and illustrated in the figures are presented by way of example only and are not intended as a limitation upon the concepts and principles of the present disclosure. As such, it will be appreciated that variations and modifications to the elements and their configuration and/or arrangement exist within the spirit and scope of one or more independent aspects as described.

What is claimed is:

1. An edge-lit luminaire comprising:
   a housing having a central opening defining an opening area;
   a lens including a plurality of extraction features substantially evenly distributed over a lens area, the lens positioned proximate the central opening, the lens area larger than the opening area;
   a light emitter positioned adjacent the lens and configured to direct light in a direction generally orthogonal with respect to the central opening;
   a first reflector positioned proximate a first surface of the lens distal the central opening, the first reflector substantially covering the first surface of the lens; and
   a second reflector positioned proximate a second surface of the lens opposite the first surface, the second reflector configured to direct light emitted in the direction of the central opening but outside of the central opening back into the lens.

2. The edge-lit luminaire of claim 1, further comprising a first heat sink coupled to the housing, the light emitter coupled to the heat sink.

3. The edge-lit luminaire of claim 2, wherein the light emitter is coupled to the first heat sink with thermal tape.

4. The edge-lit luminaire of claim 2, wherein the first heat sink is fixed to the housing, the edge-lit luminaire further comprising a second heat sink moveably coupled to the housing, the second heat sink positioned opposite the first sink.

5. The edge-lit luminaire of claim 2, further comprising a biasing member coupled to the housing, the biasing member applying a biasing force on the first heat sink directed toward central opening.

6. The edge-lit luminaire of claim 1, wherein the second reflector further includes a scored portion that is configured to be folded along a side of the lens extending between the first surface and the second surface of the lens.

7. The edge-lit luminaire of claim 1, wherein the second reflector is coupled to the lens.

8. An edge-lit luminaire comprising:
   a housing having a central opening and a first surface disposed around the central opening;
   a first heat sink secured to the first surface;
   a second heat sink moveably coupled to the first surface;
   a lens positioned between the first heat sink and second heat sink and proximate the central opening;
   a biasing member coupled to the housing and applying a biasing force to the second heat sink toward the lens; and
   a light emitter positioned adjacent to the lens and configured to emit light through the central opening after passing through the lens.

9. The edge-lit luminaire of claim 8, wherein the biasing member includes a first arm and a second arm, the first arm applying a first component of the biasing force in a first direction and the second arm applying a second component of the biasing force in a second direction generally orthogonal with respect to the first direction.

10. The edge-lit luminaire of claim 8, wherein the first heat sink includes a plurality of heat fins, the light emitter coupled to the first heat sink opposite the plurality of heat fins.

11. The edge-lit luminaire of claim 9, wherein the light emitter is coupled to the first heat sink with thermal tape.

12. The edge-lit luminaire of claim 8, wherein the lens includes extraction features, the edge-lit luminaire further comprising,
 a first reflector positioned proximate a first surface of the lens distal the central opening, the first reflector substantially covering the first surface of the lens; and
 a second reflector positioned proximate a second surface of the lens opposite the first surface, the second reflector substantially covering the second surface of the lens outside of the central opening.

13. The edge-lit luminaire of claim 8, wherein the housing further includes a groove positioned between the central opening and the first heat sink, a gasket positioned in the groove, and the lens pressed against the gasket.

14. The edge-lit luminaire of claim 8, wherein the first heat sink is one of a plurality of fixed heat sinks and the second heat sink is one of a plurality of moveable heat sinks, and wherein a ratio of moveable heat sinks in the plurality of moveable heat sinks to fixed heat sinks in the plurality of fixed heat sinks is at least 1:1.

15. An edge-lit luminaire comprising:
 a housing having a central opening and a first surface disposed around the central opening;
 a first heat sink coupled to the first surface;
 a biasing member coupled to the housing and applying a biasing force to the first heat sink toward the central opening;
 a lens including a plurality of extraction features substantially evenly distributed over a lens area, the lens positioned proximate the central opening;
 a light emitter coupled to the first heat sink and positioned adjacent to the lens, the light emitter configured to emit light through the central opening after passing through the lens; and
 a reflector positioned substantially covering a surface of the lens outside of the central opening.

16. The edge-lit luminaire of claim 15, further comprising a biasing member coupled to the housing and applying a biasing force to the first heat sink toward the central opening, wherein biasing member includes a first arm and a second arm, the first arm applying a first component of the biasing force in a first direction and the second arm applying a second component of the biasing force in a second direction generally orthogonal with respect to the first direction.

17. The edge-lit luminaire of claim 15, further comprising a second heat sink including a plurality of heat fins, the second heat sink fixed to the housing and positioned opposite the first heat sink.

18. The edge-lit luminaire of claim 17, wherein the first heat sink is one of a plurality of moveable heat sinks and the second heat sink is one of a plurality of fixed heat sinks, and wherein a ratio of moveable heat sinks in the plurality of moveable heat sinks to fixed heat sinks in the plurality of fixed heat sinks is at least 1:1.

19. The edge-lit luminaire of claim 15, further comprising a second light emitter coupled to the housing and configured to emit light in a direction opposite the central opening.

20. The edge-lit luminaire of claim 15, wherein the lens includes a plurality of extraction features substantially evenly distributed over a lens area.

* * * * *